United States Patent [19]
Hendrickson

[11] Patent Number: 5,365,579
[45] Date of Patent: Nov. 15, 1994

[54] METHOD AND APPARATUS FOR REMOTE CONTROL AND SYNCHRONIZATION ALLOWING FOR SIMULTANEOUS REMOTE COLLABORATION

[75] Inventor: Andrew D. Hendrickson, San Francisco, Calif.

[73] Assignee: LucasArts Entertainment Company, Nicasio, Calif.

[21] Appl. No.: 815,276

[22] Filed: Dec. 27, 1991

[51] Int. Cl.$^5$ .......................................... H04M 11/00
[52] U.S. Cl. .................................. 379/101; 379/93; 379/102
[58] Field of Search ................. 379/53, 93, 54, 101, 379/102, 100; 352/12-24; 358/148, 149, 142, 143, 185; 375/107, 108; 369/24, 29

[56] References Cited
U.S. PATENT DOCUMENTS

| | | | |
|---|---|---|---|
| 3,311,702 | 3/1967 | Legler | 358/149 |
| 3,472,951 | 10/1969 | Shimada et al. | 358/148 |
| 3,757,044 | 9/1973 | Verhoeckx et al. | 379/53 |
| 3,835,253 | 9/1974 | Bond | 358/149 |
| 3,912,860 | 10/1975 | Sasabe et al. | 379/100 |
| 3,926,511 | 12/1975 | Gendrot et al. | 352/19 |
| 4,050,794 | 9/1977 | Shields, Jr. | 352/12 |
| 4,172,963 | 10/1979 | Belcher et al. | 379/93 |
| 4,384,307 | 5/1983 | Kuzmik et al. | 379/100 |
| 4,689,683 | 8/1987 | Efron | 358/185 |
| 4,763,349 | 8/1988 | Siegel et al. | 379/38 |
| 4,963,967 | 10/1990 | Orland et al. | 358/149 |
| 5,045,942 | 9/1991 | Tsugane et al. | 358/149 |

Primary Examiner—Curtis Kuntz
Assistant Examiner—Jason Chan
Attorney, Agent, or Firm—Irell & Manella

[57] ABSTRACT

The system of the present invention includes a sending studio where a motion picture soundtrack is produced and a receiving studio where the motion picture is viewed while the soundtrack is transmitted from the senior studio. The system includes communications terminals at both the sending and receiving studios which can translate analog audio-image synchronization and other control or communications signals into an encoded digital signal suitable for long distance transmission and reconstruction without signal loss or serious distortion. The encoded digital is transmitted from one signal studio to another for control and synchronization of the audio and video equipment used to produce the motion picture soundtrack.

18 Claims, 3 Drawing Sheets

METHOD AND APPARATUS FOR REMOTE CONTROL AND SYNCHRONIZATION ALLOWING FOR SIMULTANEOUS REMOTE COLLABORATION

FIELD OF THE INVENTION

The present invention relates to a method and apparatus for providing remote control and synchronization of audio and/or imaging equipment used in the production of entertainment media, to allow simultaneous remote collaboration between two or more studios. More particularly, the present invention relates to a method and apparatus for providing remote control and synchronization of production equipment which allows a user to view a motion picture at a receiving studio, and simultaneously allows the same user to listen to and control a soundtrack of the motion picture that is currently being played at a remote sending studio.

BACKGROUND OF THE INVENTION

In the production of entertainment media, such as motion pictures or music recordings, it is often necessary to coordinate schedules and budgets so that key persons are available to work together in a single studio location. Often, this coordination is difficult or impossible, sometimes requiring multiple production sessions to accommodate the schedules of producers, directors, performing talent, and technical personnel.

In order to accommodate these scheduling issues, and to reduce the costs associated with bringing all key persons to a single studio location, some studios have begun to experiment with remote collaboration. The idea of remote collaboration is to have each key person work at a local studio and communicate the results of their work from one location to another using a combination of digital and microwave technologies. The current state of these technologies can allow a recording to be made at one location and directly transmitted to another location for mixing or editing, with virtually no loss in audio quality during the transmission. Alternatively, the live audio can be electronically transmitted from one location for recording, mixing, or editing at another location, thus allowing remote collaboration between locations having a range of recording or production capabilities.

For example, announcers and other voice talent have used satellite links and telephone lines to record their lines for advertising agencies and television stations. Rather than paying to fly an announcer from Los Angeles to New York for a few hours work on an automobile commercial that is due in 24 hours, a New York ad agency books time at a local New York recording studio. The local studio, in turn, schedules satellite time and books a sending studio in Los Angeles where the announcer can record his or her lines. The announcer arrives at the Los Angeles studio while the producer of the commercial goes to the New York studio. The latest script is sent by facsimile to Los Angeles minutes before the recording session begins. The studios patch the recording from Los Angeles to New York using a high quality satellite audio link, while the producer makes his comments over an ordinary long-distance telephone line. An hour or so later, the recording for the commercial is complete.

Another example of remote collaboration relates to music overdubs. Using the above dual studio scenario, a record producer can direct the mixing, mastering, or overdubbing of a music recording from one studio, using recording equipment located at another studio. Again,. the process is more efficient and can save substantial time, travel, hotel, per diem costs, etc.

The above examples illustrate that considerable savings can be realized using remote collaboration. However, the current approach to remote collaboration has an important limitation. Although the use of telecommunications technology can dramatically improve the efficiency of communications between studio locations, each studio continues to operate asynchronously to the others, with little or no real time coordination among them. Thus, while portions of a recording or other media can be transmitted between studio locations, mixing and editing these portions to form a final product must occur at a single studio location. This requirement derives from the need to precisely synchronize the portions to each other.

For example, in the production of motion pictures, the picture and soundtrack are usually produced separately at different studio locations using physically separate equipment and media. However, the design and composition of the soundtrack is based upon the action and aesthetic requirements of the picture. Thus, when the picture and soundtrack are brought together during audio post-production, a method and apparatus is needed to synchronize the film projector with the audio recorder/player. Without precise synchronization, the picture and soundtrack will quickly wander; the soundtrack will not closely follow the picture making it virtually impossible for the producer to complete the post-production edits.

A common method for synchronizing a motion picture with a soundtrack is to use electronic audio-image synchronization signals. The audio-image synchronization signals typically employed during motion picture post-production are generated by the film projector or audio recorder/player. The equipment that generates the audio-image synchronization signal uses it to control and synchronize the other equipment in the system. For example, a synchronization signal which is generated by the film projector may be used to control the playback speed and direction of the audio recorder/player. Similarly, the audio recorder/player can generate a synchronization signal which may be used to control the speed of the film projector. Moreover, the audio and video equipment is installed in a single sound studio which allows the equipment to be easily interconnected in order to maintain the required synchronization.

A typical audio-image synchronization signal used widely in the motion picture industry is called a "Bi-Phase" signal, and consists of two signal channels labeled "phase A" and "phase B". Each channel of the Bi-Phase signal contains an analog squarewave signal that is modulated in frequency over a continuous range of 0 to approzimately 960 Hertz. The modulation frequency of the Bi-Phase signal represents the rotational speed of the audio recorder, with 240 Hertz representing normal play speed. In addition, the phase difference between phase A and phase B signals indicates the rotational direction of the audio recorder/player. For example, clockwise rotation is indicated by the phase A signal leading the phase B signal by 90 degrees, while counter-clockwise rotation is indicated by the phase A signal lagging the phase B signal by 90 degrees.

During post-production of the soundtrack, the producer of the film views the motion picture and listens to the soundtrack simultaneously, while giving editing instructions to the artistic and technical crews. Typically, the producer conducts post-production at the sound studio where the soundtrack was produced, in order to make the immediate editing decisions needed to enable the artistic and technical crews to efficiently complete post-production of the soundtrack. Unfortunately, the post-production process often requires several editing sessions spread over different times during the filmmaking process, and each session may last for several days. Therefore, a significant amount of traveling, rescheduling, and expense may be required for the producer to manage the post-production at the sound studio.

A solution to the above problem is for the producer to apply remote collaboration; to view the motion picture at a receiving studio while simultaneously listening to and controlling the soundtrack which is being played and transmitted from a remote sending studio. This approach requires both the soundtrack and synchronization signals to be simultaneously communicated between the studios using a digital telecommunications network. However, since the Bi-Phase signal is analog, it is not compatible with these networks. If the Bi-Phase signal could be properly formatted, it could then be sent over existing digital telecommunications networks, thus allowing equipment at the receiving studio to be properly synchronized with equipment at the sending studio.

SUMMARY OF THE INVENTION

The present invention is directed to a method and apparatus for simultaneous remote synchronization and control of audio and video equipment between two or more interconnected studios using a digitized Bi-Phase signal. The invention also has a number of applications in television, communications, and aerospace in which there is a common need for precise clocking, synchronization and control of remotely-located equipment. Although the following discussion is primarily directed to the post-production of a motion picture soundtrack, one skilled in the art will recognize that the present invention can be applied to other embodiments involving precise synchronization and control.

More particularly, the preferred embodiment discloses a novel method and apparatus which allows a producer to manage the post-production of a motion picture soundtrack at a receiving studio, with the actual soundtrack being sent from a remote sending studio where it was originally produced. Included are communications terminals located at the receiving and sending studios for transmitting the soundtrack from the sending studio to the receiving studio over a digital telecommunications network. Further, the communications terminals can be configured to send and/or receive one or more synchronization (e.g. Bi-Phase), clock, control and communication signals over additional channels of the digital telecommunications network.

Two important facts about choosing the send/receive configuration should be noted. First, when one communications terminal is configured to send the synchronization, clock, control, and communication signals, the other communications terminal must be configured to receive these signals. Second, the configuration decision is independent of which studio is sending and which is receiving the soundtrack. In the following discussion of the preferred embodiment, the terminal located at the receiving studio is configured to send the synchronization, clock, control, and communication signals to the terminal located at the sending studio, and the terminal located at the sending studio is configured to receive these signals from the terminal located at the receiving studio. However, the opposite configuration may also be selected and the overall operation will be essentially the same.

In the preferred embodiment of the present invention, for sending the audio-image synchronization signals the communications terminal located at the receiving studio location comprises an analog-to-digital (A/D) converter for translating the analog audio-image synchronization signals into corresponding digital audio-image synchronization signals. The A/D converter includes a sampling device for sampling the analog audio-image synchronization signal at a predetermined sampling frequency, and a clocking device for providing a clock signal which controls the sampling frequency of the sampling device along with the transmission rate of the resulting digitized audio-image synchronization signals. In particular, the sampling frequency of the sampling device is determined by the clock rate of the clock signal which converts the synchronization, control, and communication signals into a sequence of encoded digital words, which are then transmitted over the digital telecommunications network.

In another embodiment of the present invention, the communications terminal at the receiving studio provides for the transmission of more than one of the digital audio-image synchronization signals for controlling and synchronizing additional equipment at the sending studio. In this embodiment, the A/D converter further includes a multiplexer which allows the selection and transmission of one or more of the digital audio-image synchronization signals at a time. The multiplexer can also be controlled by the clock rate. For example, using a clock rate of less than 100 kilohertz allows transmission of one digital audio-image synchronization signal, while a clock rate of more than 100 kilohertz allows the simultaneous transmission of more than one digital audio-image synchronization signal.

In a further embodiment of the present invention, the communications terminal at the receiving studio allows additional control or communication signals to be transmitted simultaneously with the digital audio-image synchronization signals. The additional control or communication signals can include, but are not limited to, a synchronous code signal, a time delay signal, an intercom control signal, or a switch control signal. The additional control and communication signals provide greater flexibility in managing the soundtrack post-production process.

In this further embodiment, the sampling device comprises a parallel-to-serial converter which includes a plurality of parallel inputs and a single serial output. A plurality of the synchronization, control, or communication signals can be applied to the parallel inputs to form a composite serial output signal consisting of the sequence of encoded digital words. Each of the synchronization, control, or communications signals corresponds to one or more bits of each digital word. For example, bit 1 of each digital word is the synchronous code signal, bit 2 is a Bi-Phase synchronization signal, etc. The sequence of digital words is transmitted serially to the sending studio over the digital telecommunications network.

In the preferred embodiment of the invention, the clock frequency may be set to either 64 or 128 kilohertz. Using an 8-bit parallel-to-serial converter as the sampling device, a corresponding sampling frequency of either 8 kilohertz corresponding to the 64 kilohertz clock or 16 kilohertz corresponding to the 128 kilohertz clock, is provided. In either case, the Bi-Phase signal is always sampled at 16 kilohertz, and the corresponding digital sampling resolution is one bit.

The communications terminal at the receiving studio further includes an interface device which is compatible with an RS-422 or related telecommunications standard. The interface device is a local-to-system interface for transforming the sequence of encoded digital words into the RS-422 or related format for transmission over the digital telecommunications network. The transformed sequence is then sent to a telecommunications system, such as a standard T1 drop and-insert system, channel bank, or channel service unit/data service unit (CSU/DSU), which in turn routes the sequence onto the T1 pulse code modulation (PCM) bit stream.

In the preferred embodiment, for receiving the sequence of encoded digital words from the receiving studio, the terminal located at the sending studio comprises elements similar to those of the terminal located at the receiving studio, but operates in reverse to reconstruct the synchronization, control, and communication signals from the sequence of encoded digital words. Thus, the terminal at the sending studio includes an interface device which is compatible with the RS-422 or related telecommunications standard. Here, the interface device functions as a system-to-local interface for transforming the received RS-422 or related format signals into the digital audio-image synchronization, communication, and/or control signals suitable for further processing.

In the preferred embodiment, the communications terminal at the sending studio further comprises a digital-to-analog (D/A) converter for converting the received digital synchronization signals into corresponding analog signals. The D/A converter of the terminal located at the sending studio includes a sampling device for sampling the received sequence of encoded digital words at a predetermined sampling frequency, and a clock device for providing a clock signal for controlling the sampling frequency of the sampling device. The sampling frequency is determined by the clock rate of the clock signal which is, in turn, slaved to the clock device of the terminal at the receiving studio.

In another embodiment of the present invention, the terminal located at the sending studio provides for the selection of more than one of the digital audio image synchronization signals for controlling and synchronizing additional equipment as discussed earlier with reference to the communications terminal of the receiving studio. In this embodiment, the D/A converter includes a multiplexer which provides for the simultaneous selection of one or more of the digital audio-image synchronization signals. The multiplexer is controlled by the clock rate, for example, using a clock rate of less than 100 kilohertz which allows reception of one digital audio-image synchronization signal, while a clock rate of more than 100 kilohertz allows the simultaneous reception of one or more digital audio-image synchronization signals.

In a further embodiment the terminal located at the receiving studio is designed to allow any or all of the above-mentioned additional control or communication signals discussed above to be received simultaneously with the digital audio-image synchronization signals. In this embodiment, the sampling device comprises a serial-to-parallel converter which includes a single serial input and a plurality of parallel outputs. The sequence of encoded digital words which encode the digital audio-image synchronization, communication, or control signals are applied to the serial input. Each of the plurality of parallel outputs of the serial-to-parallel converter will then contain one of the digital audio-image synchronization, control, or communication signals.

In order to illustrate one use of the present invention, consider again the previous example of recording an automobile commercial for a New York advertising agency, but this time using an announcer in Los Angeles and musicians in San Francisco. As before, the announcer, goes to the Los Angeles studio and the director goes to the New York studio, while the musicians report to a San Francisco studio. The latest script is sent by facsimile to Los Angeles and the musical score is similarly sent to San Francisco. Projectors in the Los Angeles and San Francisco studios are patched to the New York studio using the present invention with a terminal (e.g. a sound receiver) in New York and other terminals (e.g. a sound transmitters) in Los Angeles and San Francisco. The sound receiver terminal is configured to send the synchronization signals and the sound transmitters terminals are configured to receive the synchronization signals. Finally, a three-way conference call is set up using standard long distance telephone lines.

When the recording session begins, the New York recorder is started which synchronously starts the Los Angeles and San Francisco projectors. The voice and music tracks are simultaneously recorded in New York, with the director making comments over the telephone line. As before, the commercial is completed within a very short time, but in this case no additional mixing or voice-over work is required.

These and other features and advantages of the present invention will become apparent after studying the following description of the present invention taken in conjunction with the following drawings.

DETAILED DESCRIPTION OF THE PREFERRED EMBODIMENTS

An embodiment of an apparatus constructed in accordance with the present invention now discussed. The present invention comprises a network of two or more interconnected sending and/or receiving locations which provide for the simultaneous remote collaboration between equipment and personnel to produce media at one or more of the locations. The particular media produced, along with the specific configuration of the network, may be varied according to the production requirements of each project. For purposes of illustration, the post-production of a motion picture soundtrack using a network consisting of a sending studio and a receiving studio is discussed, however, the present invention is not limited to this specific application or network configuration.

Figure 1:
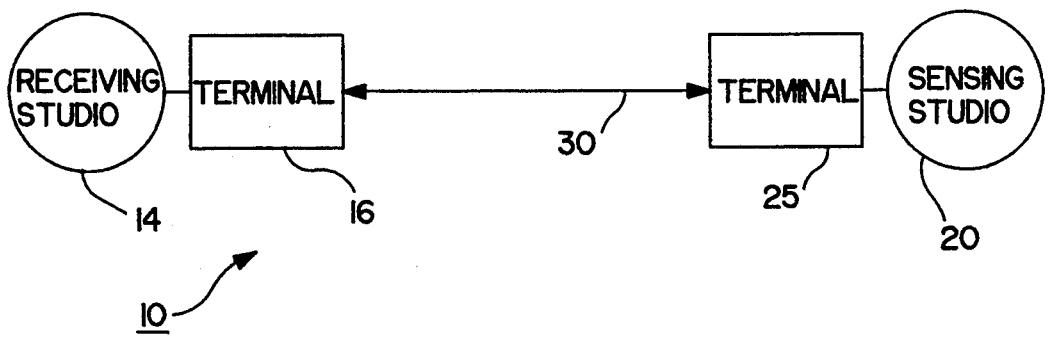
FIG. 1 shows a configuration which allows a motion picture producer to remotely control the post-production of a motion picture soundtrack which is produced at a studio in accordance with the present invention.

As shown in FIG. 1, anapparatus 10 comprises a receiving studio 14 and a sending studio 20. Receiving studio 14 may be a motion picture studio or a screening room at the home of a motion picture producer. Receiving studio 14 is provided with a communications terminal 16 for receiving the motion picture soundtrack and for sending and/or receiving one or more audio-image synchronization signals, along with other control or communication signals, to/from sending studio 20 over a digital telecommunications network 30. Sending studio 20 also includes a communications terminal 25 sending the motion picture soundtrack and for receiving and/or sending the one or more audio-image synchronization signals to/from receiving studio 14. Although communication terminals 16 and 25 are configured in the following as a receiver and a sender, respectively, should be understood that such configuration is only for purposes of illustration. Either of communication terminals 16 or 25 can transmit or receive the soundtrack along with the synchronization, control, or communication signals.

Receiving studio 14 may additionally be provided with audio and imaging equipment needed to simultaneously view the motion picture, listen to the soundtrack, and communicate with sending studio 20. In particular, the audio and imaging equipment may include a film projector, a sound recording/playing device, a sound amplifier, and one or more sound processing devices. Communication terminal 16 may be coupled to the audio and imaging equipment for synchronizing and controlling the audio and imaging equipment of receiving studio 14 with similar audio and imaging equipment located at sending studio 20. This arrangement allows the motion picture director to view the motion picture at receiving studio 14 while simultaneously listening to the soundtrack that is simultaneously being sent from sending studio 20.

More particularly, using apparatus 10 the director can manage the audio post-production process from receiving studio 14, which may be located hundreds of miles away from sending studio 20, using the following general method. The director views the motion picture while listening to the soundtrack, and makes the necessary post-production decisions in real time while the artistic and technical crews, which are located at sending studio 20, make the requested changes. As soon as the changes are made, the director or producer can immediately approve the changes and the post-production process can continue.

Figure 2:
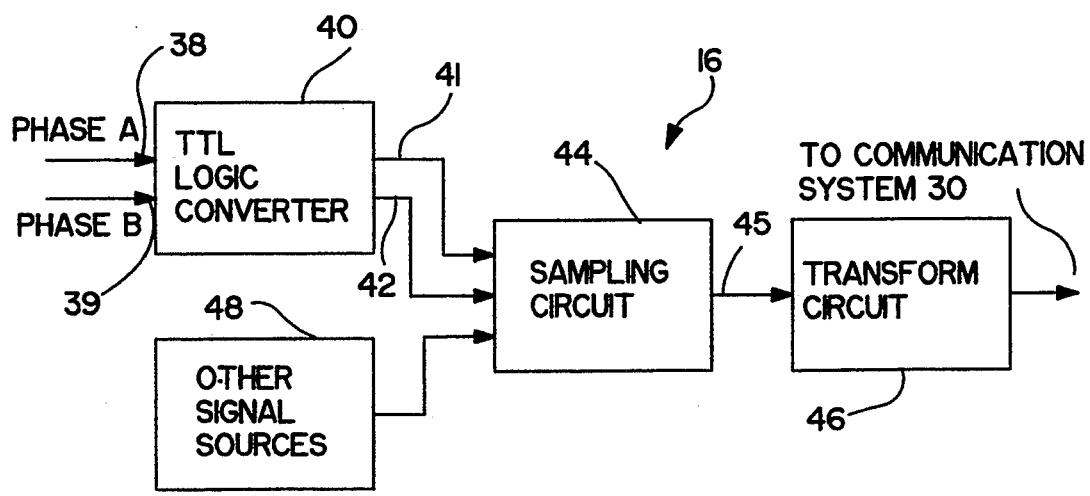
FIG. 2 hows a block diagram of an embodiment of a sound receiving terminal used in the apparatus of the present invention.

FIG. 2 is a block diagram of a preferred embodiment of communication terminal 16 which is located at receiving studio 14. Communication terminal 16 comprises a transistor-transistor logic (TTL) converter 40 for converting one or more analog audio-image synchronization signals (38 and 39) into corresponding TTL-compatible audio-image synchronization signals, and a sampling circuit 44 for sampling the one or more TTL-compatible audio-image synchronization signals (41 and 42) at a predetermined sampling rate to produce one or more corresponding digital audio-image synchronization signals. Terminal 16 further comprises an interface device 46 for transforming the digital audio-image synchronization, communication, and control signals to a signal format suitable for coupling to digital telecommunications network 30.

More particularly, referring back to ttl converter 40, inputs 38 and 39 respectively include phase A and phase B signals of an analog Bi-phase signal. TTL converter 40 also includes outputs 41 and 42 for respectively generating one of the respective digitized phase A or phase B signals of the Bi-Bhase synchronization signal. Outputs 41 and 42 of TTL converter 40 are coupled to sampling circuit 44. In accordance with the preferred embodiment, sampling circuit 44 includes a plurality of parallel inputs which simultaneously receive one or more parallel signals. The parallel signals are sampled at the predetermined sampling rate to produce a serial output signal 45. Output signal 45 of sampling circuit 44 is coupled to interface device 46 where the sampled signals are transformed into signals having the proper electrical and timing characteristics for transmission. The transformed signals are then sent to a telecommunications system, such as a T1 drop-and-insert system, channel bank or CSU/DSU, where the transformed signals are routed onto a T1 pulse-code modulation (PCM) bit stream which is, in turn, sent to the digital telecommunications network.

Continuing with FIG. 2, communications terminal 16 further comprises a signal source 48 for providing one or more control or communication signals for additional remote control and communication purposes. Sampling circuit 44 can sample the one or more control and/or communication signals at predetermined sampling rate to produce corresponding digital signals. The number and type of the one or more control or communication signals depends upon the requirements of particular users or systems, and the number of corresponding parallel inputs of sampling circuit 44 may be selected to accommodate as many synchronization, communication, and control signals as required. In addition, one or more of the parallel inputs of sampling circuit 44 may also be saved for future expansion, again as required by user or system requirements.

For. example, one of the additional control signals from signal source 48 that can be applied to one of the parallel inputs of sampling circuit 44 is a synchronous code bit which identifies the first bit of each word of the sequence of digital words. The synchronous code bit is transmitted along with the digital audio-image synchronization signals, as part of a sequence of digital words which are multiplexed from each of the corresponding signals applied on the parallel inputs of sampling circuit 44.

The function of each of the remaining control or communication signals is now briefly described. An intercom control signal is for providing control of voice communications between the receiving and sending studios. In addition, a time delay detection signal is used for detecting the communication time delay between the receiving studio and sending studio. Finally, a switch control signal is for remote control of certain auxiliary devices. A more detailed description of signal source 48 and the additional control or communication signals will be discussed later with reference to FIGS. 3 and 4.

The reconstruction of the signals received from telecommunications network 30 occurs at sending studio 20 by communication terminal 25, using a process similar to that of communication terminal 16, but in reverse order.

Figure 3:
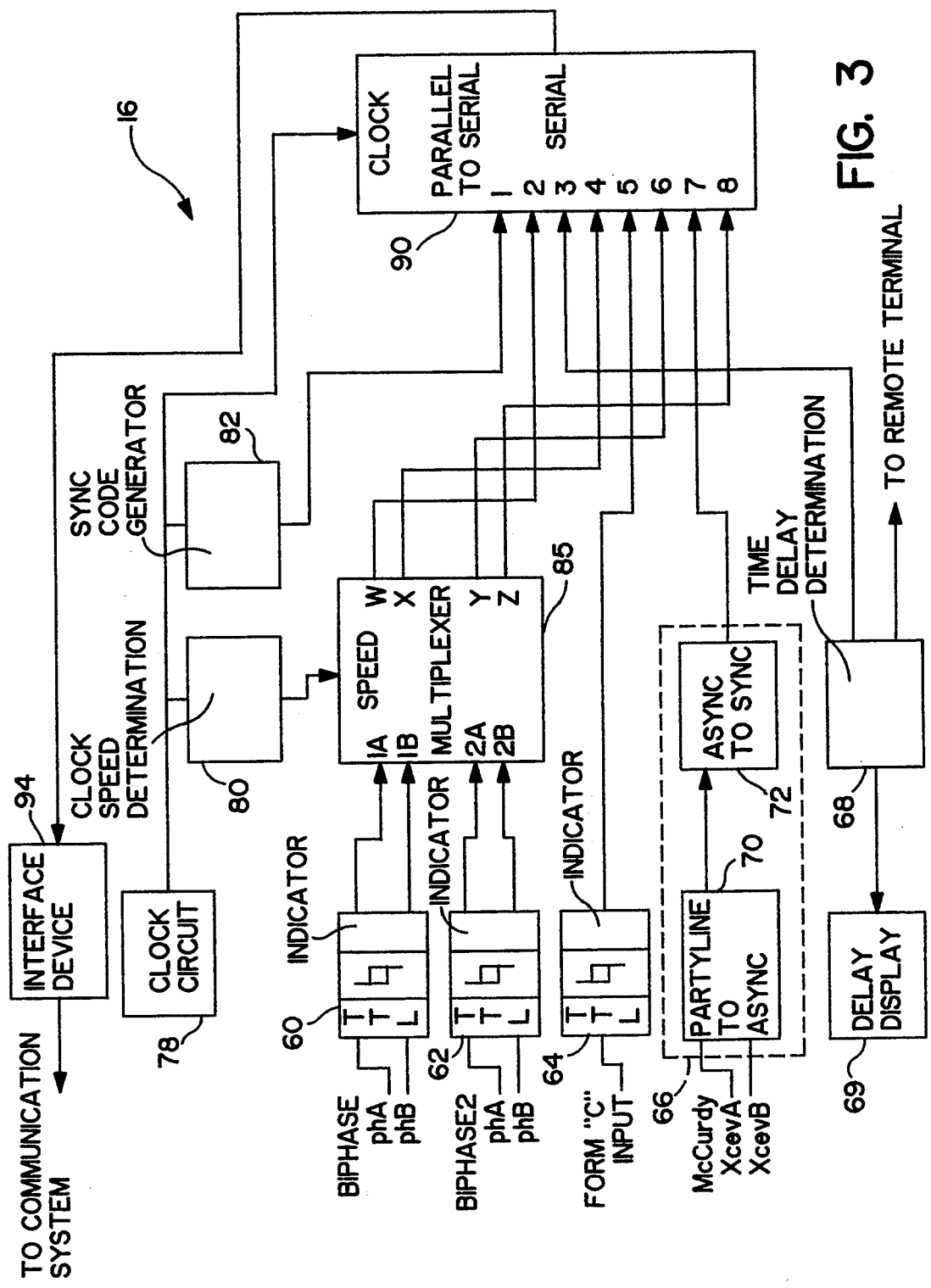
FIG. 3 shows a more detailed block diagram of the receiving terminal constructed in accordance with the present invention for translating each synchronization, communication, or control signal into a corresponding digital signal format suitable for long distance transmission without signal loss or serious distortion.

FIG. 3 is a more detailed block diagram of a preferred embodiment of communication terminal 16. As previously discussed, communication terminal 16 can simultaneously transmit two complete Bi-Phase signals, each consisting of a phase A and a phase B signal, onto digital telecommunications network 30. This embodiment further allows the simultaneous transmission of the one or more additional control or communications signals along with the two Bi-Phase signals to sending studio 20. A parallel-to-serial converter 90, which serves as a sampling device, has eight parallel inputs which can simultaneously receive eight parallel input signals. In addition to the two Bi-Phase synchronization signals, the embodiment of FIG. 3 provides the following additional control signals: a synchronous code signal, a time delay detection signal, a switch control signal, and an intercom control signal.

Continuing with FIG. 3, communication terminal 16 includes two TTL converters 60 and 62, each of which receive a Bi-Phase synchronization signal. Each Bi-Phase signal comprises a phase A signal and a phase B signal. The outputs of TTL converters 60 and 62 are corresponding digital Bi-Phase synchronization phase A and phase B signals. In accordance with the preferred embodiment, a multiplexer 85 is provided to select either one or both of the digital Bi-Phase synchronization signals from the outputs of TTL converters 60 and 62. Multiplexer 85 has four inputs 1A, 1B, 2A and 2B for receiving four digital signals from TTL converters 60 and 62 and four outputs W, X, Y, and Z for providing selected Bi-Phase signals to parallel-to-serial converter 90.

Communication terminal 16 is further provided with another TTL converter 64 for converting the switch control signal into a corresponding digital control signal, an intercom signal device 66 for converting the intercom control signal into a corresponding synchronous intercom control signal, and a time delay determination device 68 for determining total system time delay using the time delay detection signal. Intercom signal device 66 may further include a first converter 70 for converting the intercom signal into a corresponding asynchronous signal and a second converter 72 for further converting the asynchronous signal from first device 70 into a corresponding synchronous signal.

Time delay determination device 68 generates the time delay detection signal which is sent to communication terminal 25. Time delay determination device 68 also receives a signal returned from a corresponding device in communication terminal 25 to determine the total system time delay between receiving studio 14 and sending studio 20. A display device 69 may be connected to time delay determination device 68 for continuous display and monitoring of the system time-delay. The use of the time delay determination device is important, since the synchronization tolerance between the picture and the soundtrack is plus or minus one frame (i.e., one frame advanced or retarded), where the timing of one frame is 1/24 of a second.

The switch control signal is a form "C" relay contact input which is used for general-purpose remote control of auxiliary devices. Examples of using the switch control signal include selecting the recording or playback functions of an audio recording device, control of "on air" lights, or control of a mute system in the remote sound studio to enable intercom conversation.

The intercom control signal is provided to operate with an intercom system for voice communications between receiving studio 14 and sending studio 20. The intercom control signal provides a data transport path and allows, for example, an intercom master console to exchange control information with one or more remote intercom panels. The control information contains specific information about which intercom push-to-talk switches and channel monitor switches have been depressed. Additionally, the remote intercom panels have a continually updated alphanumeric channel busy/idle displays that receive information from the master console.

The output signals from multiplexer 85, and from devices 64, 66 and 68 are applied to the parallel inputs (pins 2–8) of a parallel-to-serial converter 90. A clock device 78 derives a clock signal with a predetermined clock rate from the T1 Telecommunications system, which is used to control the sampling rate of parallel-to-serial converter 90. The synchronous code generator 82 is coupled between the output of the clock circuit 78 and the input (lead 1) of the parallel-to-serial converter 90 to provide a synchronous code which identifies the first bit of each word of the sequence of digital words. The eight parallel inputs are sampled by the parallel-to-serial converter 90 to form a digital word. In accordance with the preferred embodiment, the clock frequency is arranged to be 64 kilohertz or 128 kilohertz so that the sampling frequency can be either 8 kilohertz or 16 kilohertz. Note that the sampling frequency of the Bi-Phase signals is always 16 kilohertz, with a one bit sampling resolution. In this embodiment, the sampling resolution of the apparatus 10 is one bit.

Between multiplexer 85 and the output of clock device 78 is a clock speed determination device 80 which provides a control signal to multiplexer 85 for selection of the Bi-Phase signals in response to the clock rate. When the sampling frequency is 8 kilohertz, one Bi-Phase signal is selected by multiplexer 85. When the sampling frequency is 16 kilohertz, two Bi-Phase signals are selected by multiplexer 85. Specifically, the operation of multiplexer 85 can be expressed by the following logic equations:

$$W = 1A$$

$$X = (speed)(1B) + (speed')(2A)$$

$$Y = (speed)(1A) + (speed')(1B)$$

$$Z = (speed)(1B) + (speed')(2B)$$

where the speed signal is TRUE if clock speed is less than 100 kilohertz.

The output signal from parallel-to-serial converter 90 is then coupled to an interface device 94 which transforms the digital encoded signal into a signal format suitable for transmission over digital telecommunications network 30. Interface device 94 may be compatible with an RS-422 or related interface standards, such as RS-432, or V.35.

In accordance with the preferred embodiment, the digital signals can be transmitted between receiving studio 14 and sending studio 20 using a high-capacity T1 digital carrier. The T1 data line that is used can be a permanent point-to-point leased line, or it can be requested from the carrier company at predetermined times as needed, in order to reduce costs. In the permanent leased line situation, the end-to-end data transmit time and distance is fixed and the data delay between the end points changes by only a small amount. However, in the on-demand situation, the end-to-end data transit time will vary depending on end point location and the path through which the signal is routed to its destination, which makes monitoring the time delay very important.

Figure 4:
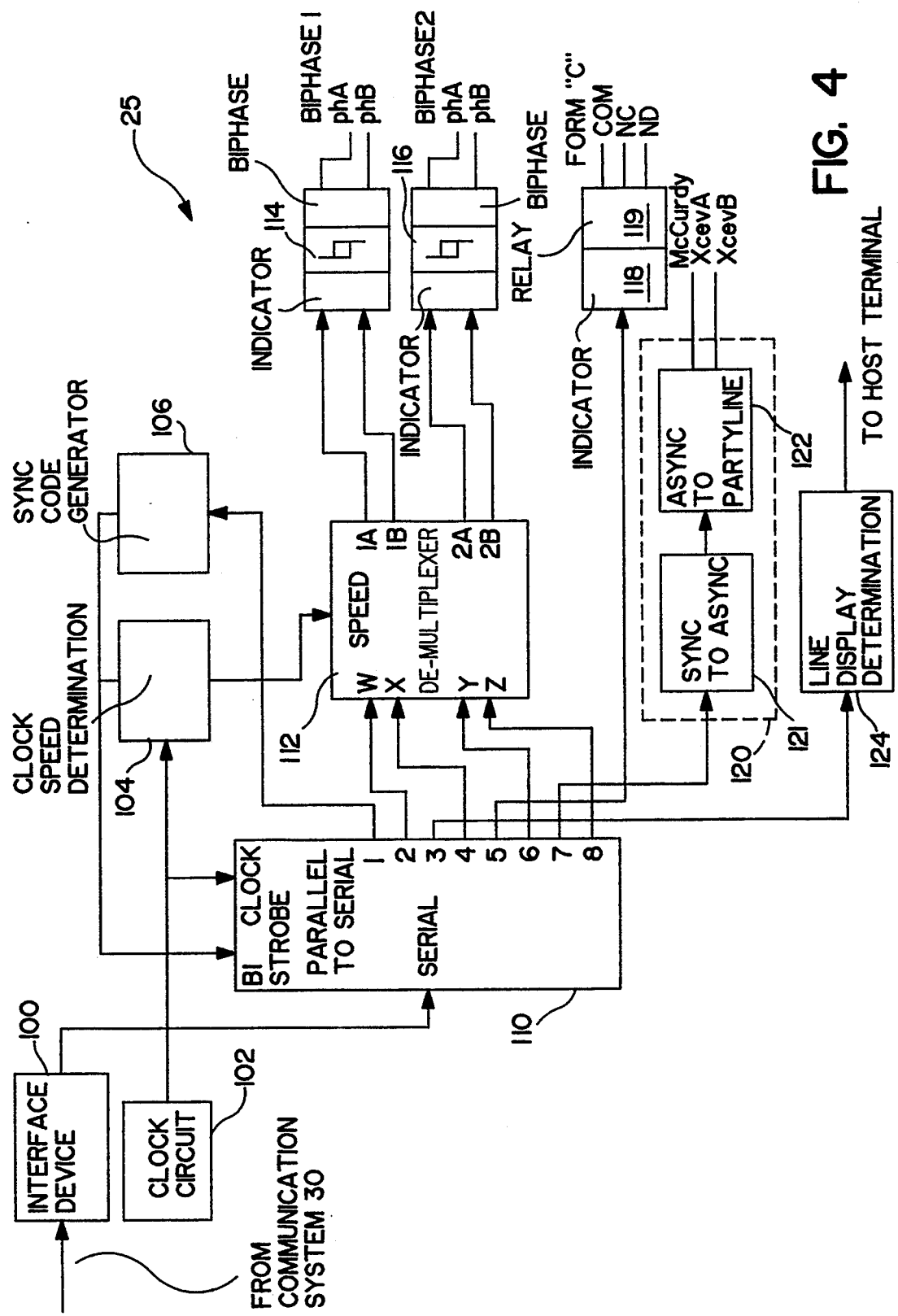
FIG. 4 shows a detailed block diagram of an embodiment of a sending terminal constructed in accordance with the present invention for inverse-translating each received image-audio synchronization, communication, or control signal into a corresponding analog signal.

A preferred embodiment of communication terminal 25 used in the preferred embodiment is shown in FIG. 4. Terminal 25 reconstructs the synchronization, control, and communication signals from the received sequence of encoded digital words as transmitted from communication terminal 16. Terminal 25 includes an interface device 100 for transforming the received sequence of encoded digital words into a signal format suitable for processing by terminal 25. The transformed signal is then sent to a serial-to-parallel converter 110. A clock signal is applied to the serial-to-parallel converter 110 by a clock device 102. A synchronous code reader 106 reads the incoming identity code to identify the first bit of each word of the sequence of encoded digital words. The different signal components or different bits of each reconstructed word are respectively sent to a de-multiplexer 112, a TTL logic converter 118 connected to one or more relays 119, to a synchronous-to-intercom converter 120, and to a time delay determination circuit 124.

The synchronous-to-intercom converter 120 further includes a synchronous-to-asynchronous device 121 and an asynchronous-to-intercom device 122. De-multiplexer 112, under control of a clock speed determination circuit 104, selects the input signals W, X, Y, and Z to produce four output signals 1A, 1B, 2A and 2B. The output signals 1A and 1B are coupled to a digital-to-analog converter 114 for restoring one Bi-Phase signal. The output signals 2A and 2B are coupled to another digital-to-analog converter 116 for restoring another Bi-Phase signal. The operation of de-multiplexer 112 can be expressed by the following logic equations:

$$1A = W + (speed)(Y)$$

$$1B = (speed)(X+Z) + (speed')(Y)$$

$$2A = (speed')(X)$$

$$2B = (speed')(Z)$$

wherein the speed is true when clock frequency is less than 100 kilohertz.

In the above embodiments, the soundtrack is sent from the receiving studio to the remote studio through a separate digital telecommunications line. However, the soundtrack may also be sent from the sending studio to the receiving studio as production requirements dictate. In either case, the soundtrack is coupled onto the digital telecommunications network through a standard audio codec system.

The present invention has been described in an exemplary and preferred embodiment, but is not limited thereto. Those skilled in the art will recognize that a number of additional modifications and improvements can be made to the invention without departure from the essential spirit and scope. For example, a network of more than two studios can be created using the present invention. Additionally, the network of studios can be used for a variety of mastering, mixing, editing, or other production tasks. The present invention is intended to be limited only by the following attached claims.

What is claimed is:

1. An apparatus for remote control of motion picture soundtrack post-production, comprising:
   a receiving studio means for viewing a motion picture;
   a sending studio means for producing and playing said motion picture soundtrack;
   means for generating a plurality of signals for synchronization, control, or communication;
   means for encoding said plurality of signals as a sequence of encoded digital words, each one of said encoded digital words comprising a plurality of bits, and each one of said plurality of signals corresponding to a predetermined one or more of said plurality of bits, said means for encoding further comprising first sampling means for sampling said plurality of signals at a predetermined sampling frequency, and clock means for providing a clock signal which determines said sampling frequency;
   means for transmitting said sequence of encoded digital words over a communication network, said means for transmitting further comprise means for communicating said sequence of encoded digital words from said receiving studio mans to said sending studio means;
   means for decoding said sequence of encoded digital words to recover said plurality of signals; and
   means for remotely controlling said motion picture soundtrack post-production, using said plurality of signals.

2. The apparatus of claim 1 further comprising means for converting said sequence of encoded digital words into a format for transmission over a digital telecommunications network.

3. The apparatus of claim 1 wherein said first sampling means further comprises a plurality of parallel inputs for receiving said plurality of signals, and an output for producing said sequence of encoded digital words.

4. The apparatus of claim 1 further comprising a synchronous code generation means for generating a synchronous code identifying the first bit of each word of said sequence of encoded digital words.

5. The apparatus of claim 4 further comprising a synchronous code receiving means for receiving said synchronous code for identifying the first bit of each word of said sequence of encoded digital words.

6. The apparatus of claim 1 wherein said means for generating a plurality of signals further comprise means for generating a time delay detection signal for determining transmission time delay of said sequence of encoded digital words.

7. The apparatus of claim 6 further comprising means for receiving said time delay detection signal.

8. The apparatus of claim 1 wherein said first sampling means further comprises a multiplexing means for selecting one or more of said plurality of signals for sampling by said first sampling means.

9. The apparatus of claim 1 wherein said means for decoding said sequence of encoded digital words further comprises a second sampling means for sampling said sequence of encoded digital words at a predetermined sampling frequency to produce said plurality of signals, and a clock means for providing a clock signal which determines said predetermined sampling frequency.

10. The apparatus of claim 9 wherein said second sampling means further comprises a single input for receiving said sequence of encoded digital words and a plurality of parallel outputs for producing said plurality of signals.

11. The apparatus of claim 9 wherein said means for decoding further comprise a de-multiplexing means for selecting one of said plurality of signals from said second sampling means.

12. An apparatus for remote control and synchronization allowing for simultaneous remote collaboration between a sending studio and a receiving studio, said simultaneous remote collaboration for use in the post-production of entertainment media, said apparatus comprising:

means for generating one or more synchronization, control, or communication signals including a first translating means for converting said one or more synchronization, control, or communication signals into a sequence of encoded digital words, said first translating means further comprising:

first sampling means having one or more inputs and a single output, said first sampling means for sampling said one or more synchronization, control, or communication signals, and said sampling occurring at a predetermined sampling frequency to produce said sequence of encoded digital words at said single output;

first clock means for providing a first clock signal to said first sampling means, said first clock signal for determining said predetermined sampling frequency;

code generation means for generating a synchronous code signal for identifying the first bit of each word of said sequence of encoded digital words; and first interface means for transforming said sequence of encoded digital words into a signal format for transmission over a digital telecommunications network; and means for receiving said sequence of encoded digital words including a second translating means for converting said sequence of encoded digital words into said one or more synchronization, control, or communication signals, said second translating means further comprising:

second sampling means having a single input and one or more outputs, said second sampling means for sampling said sequence of encoded digital words, and said sampling occurring at a predetermined sampling frequency to produce said one or more synchronization, control, or communication signals at said one or more outputs;

second clock means for providing a second clock signal to said second sampling means, said second clock signal for determining said predetermined sampling frequency;

code receiving means for receiving said synchronous code signal for identifying the first bit of each word of said sequence of digital encoded words; and second interface means for transforming said sequence of digital encoded words received over said digital telecommunications network into a signal format for use by said receiving means.

13. The apparatus of claim 12 wherein said first translating means further comprises a multiplexer means for selecting one or more of said one or more synchronization signals for sampling by said first sampling means.

14. The apparatus of claim 13 wherein said means for generating further comprises a means for generating a time delay detection signal for determining transmission time delay between said sending studio and said receiving studio.

15. The apparatus of claim 14 wherein said means for generating further comprises a first switch control means for providing a switch control signal, and a first intercom control means for providing an intercom control signal.

16. The apparatus of claim 15 wherein said second translating means further comprises a de-multiplexer means for selecting one or more of said one or more synchronization signals from said second sampling means.

17. The apparatus of claim 16 wherein said means for receiving further comprises a means for receiving said time delay detection signal for determining transmission time delay between said sending studio and said receiving studio.

18. The apparatus of claim 17 wherein said means for receiving further comprises a second switch control means for receiving said switch control signal, and a second intercom control means for providing an intercom control signal.

* * * * *